Dec. 25, 1956 | JACKSON CHUNG | 2,775,137
OVERLOAD RELEASE CONNECTORS
Filed Nov. 14, 1952 | 4 Sheets-Sheet 1
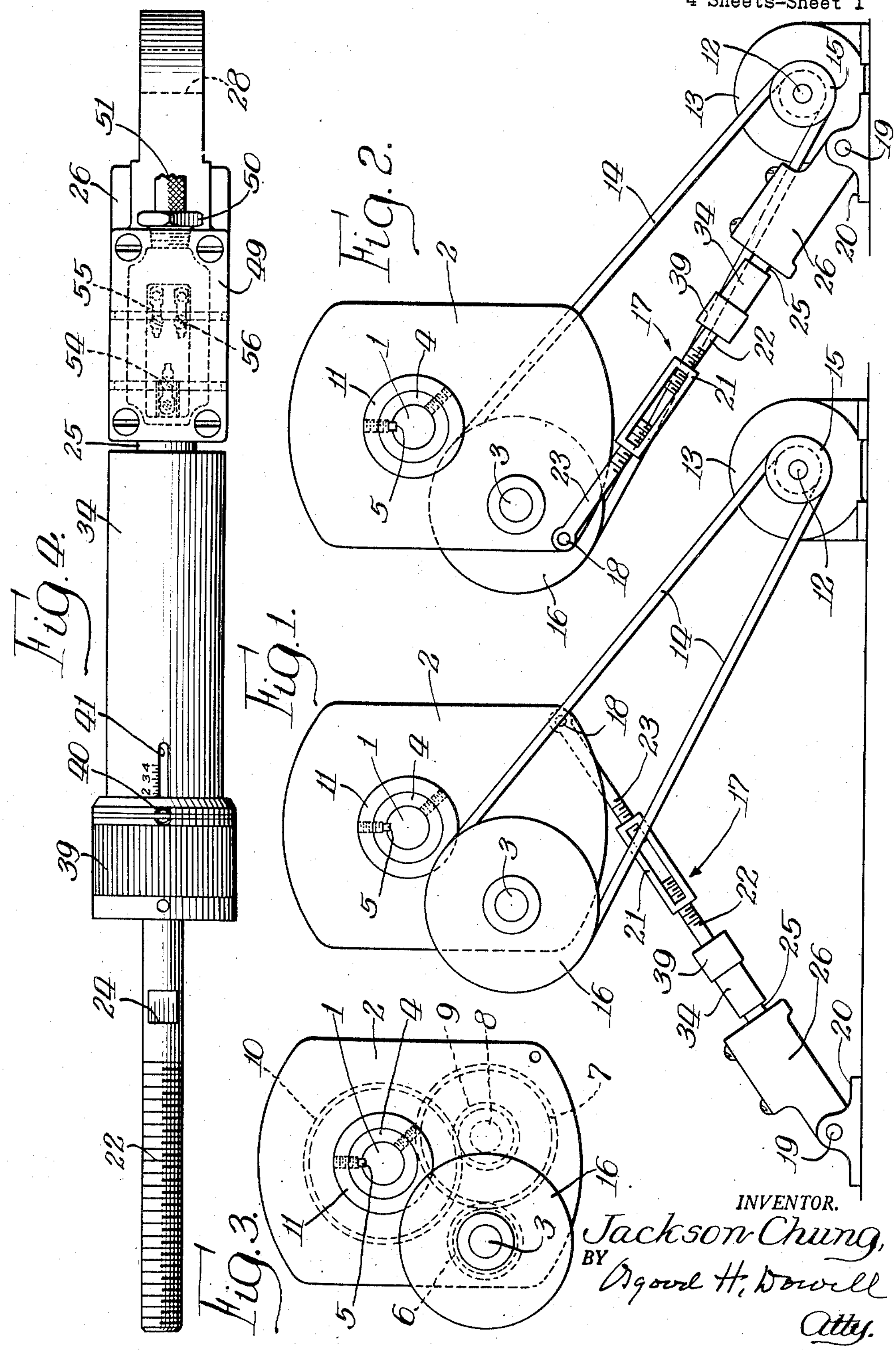

OVERLOAD RELEASE CONNECTORS
Filed Nov 14, 1952
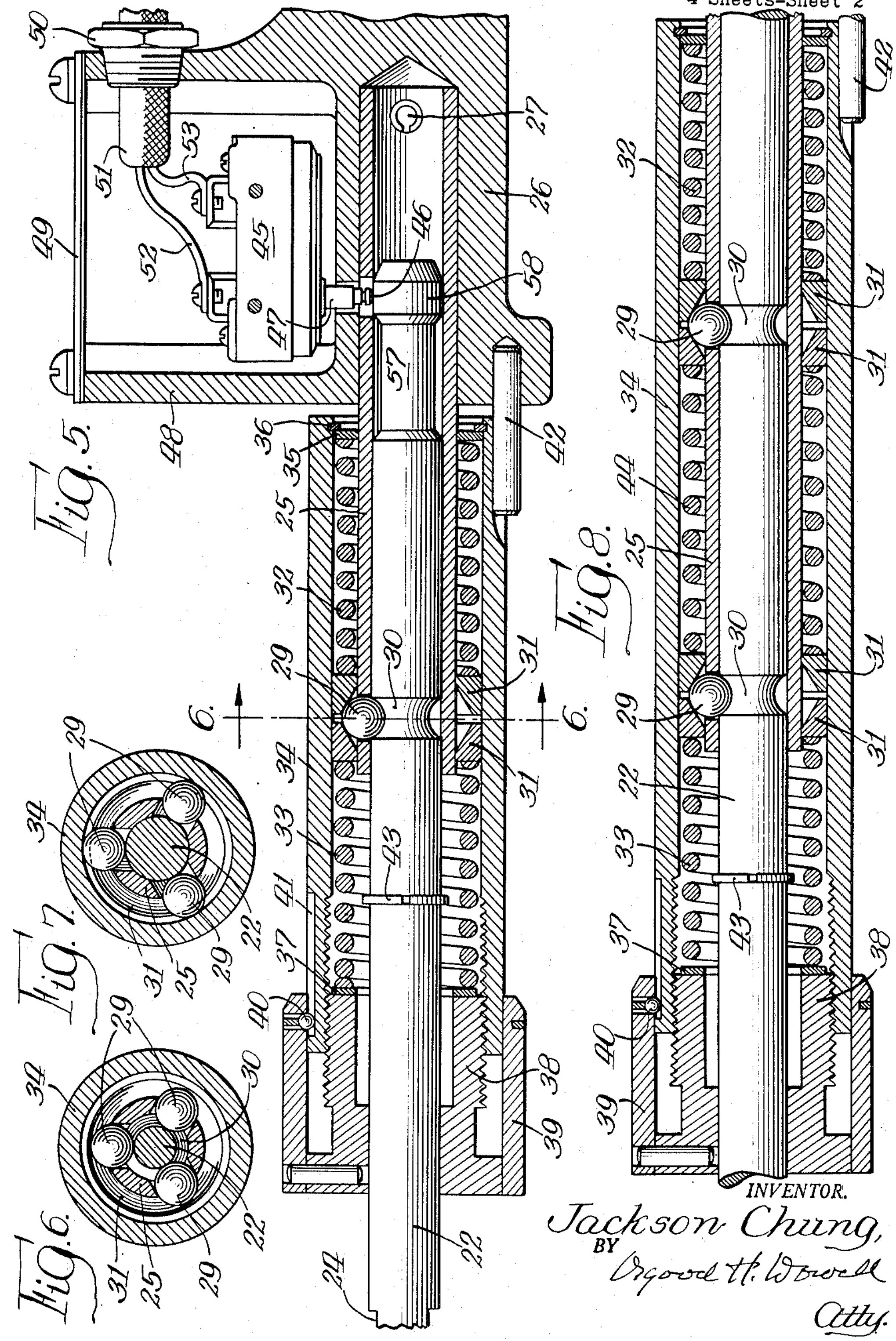
INVENTOR.
Jackson Chung,
BY Osgood H. Dowell
Atty.

OVERLOAD RELEASE CONNECTORS
Filed Nov 14, 1952 4 Sheets-Sheet 3
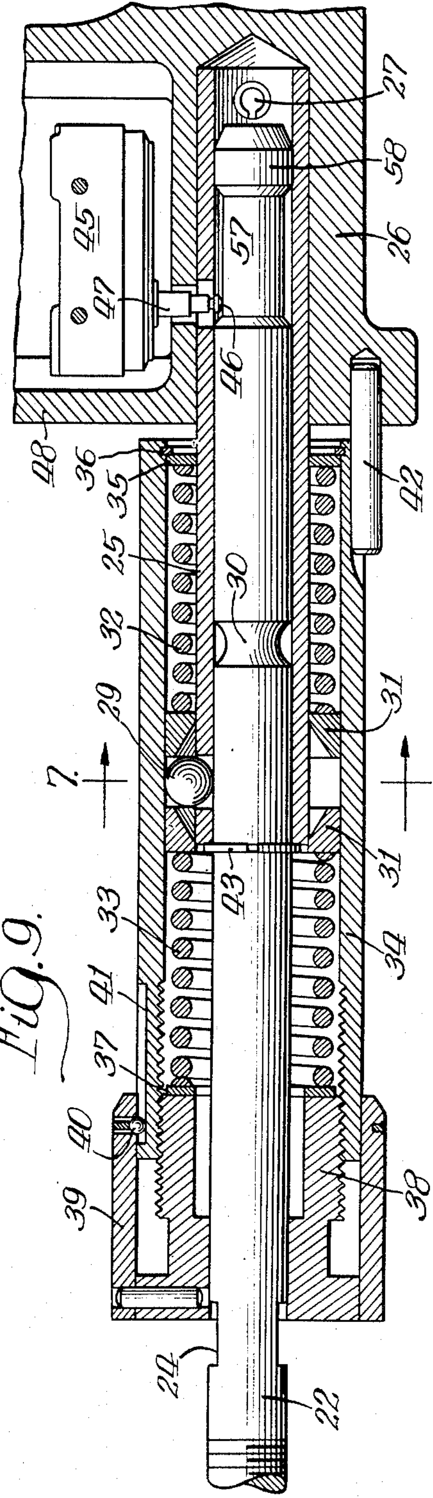
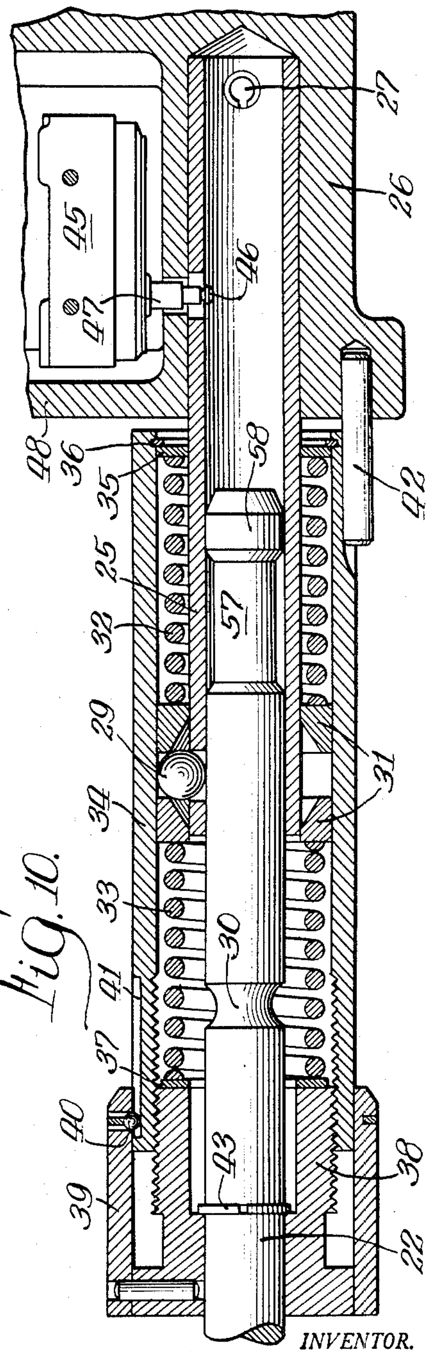
INVENTOR.
Jackson Chung,
BY Osgood H. Dowell
Atty.

Dec. 25, 1956 JACKSON CHUNG 2,775,137
OVERLOAD RELEASE CONNECTORS
Filed Nov 14, 1952
4 Sheets-Sheet 4
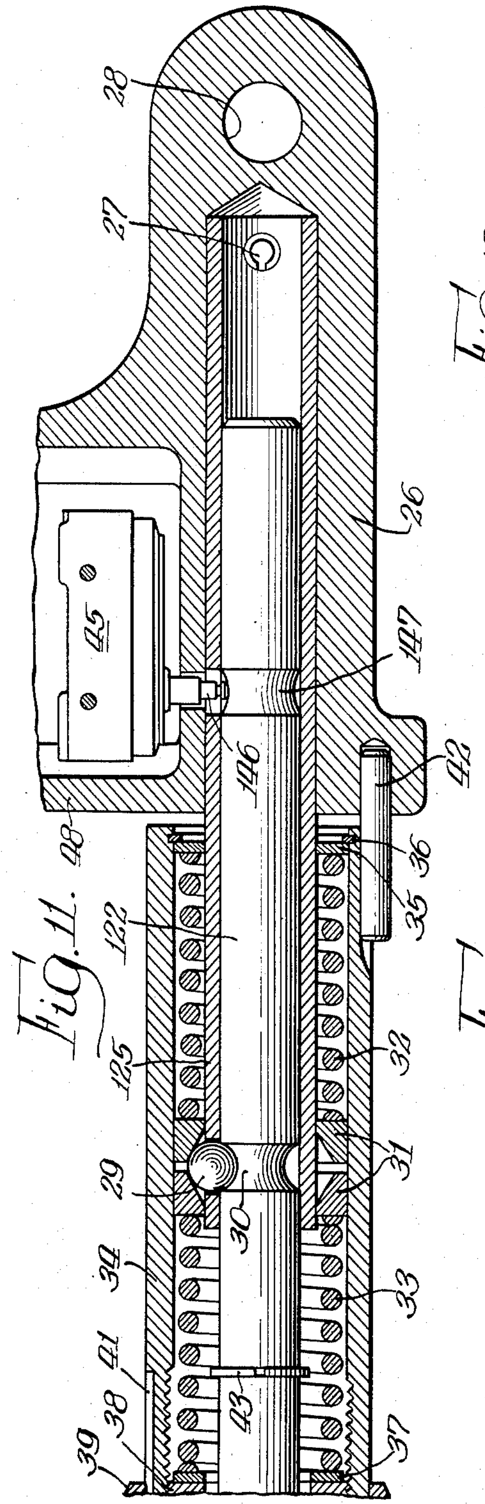
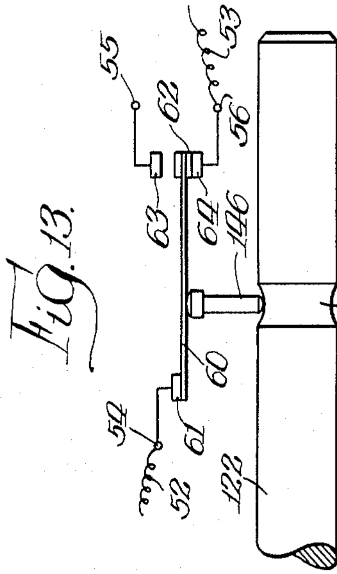
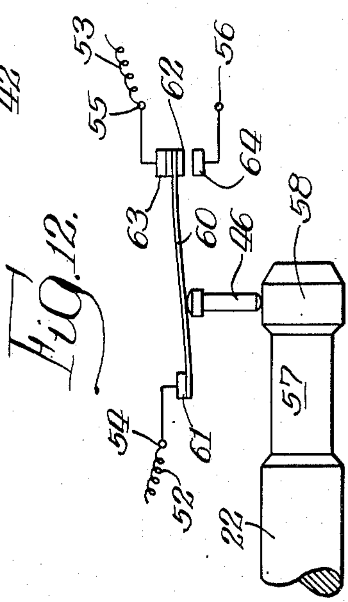
INVENTOR.
Jackson Chung,
BY Osgood H. Dowell
Atty.

United States Patent Office 2,775,137

Patented Dec. 25, 1956

2,775,137

OVERLOAD RELEASE CONNECTORS

Jackson Chung, South Bend, Ind., assignor to Dodge Manufacturing Corporation, Mishawaka, Ind., a corporation of Indiana

Original application November 7, 1951, Serial No. 255,274, now Patent No. 2,753,969, dated July 10, 1956. Divided and this application November 14, 1952, Serial No. 320,467

8 Claims. (Cl. 74—584)

This invention relates to an overload release connector for use as a connecting rod between two machine members, the connector being adopted for a releasing action when the load thereon exceeds a predetermined value.

In my copending application Serial No. 255,274, filed November 7, 1951, of which the present application is a division, there is disclosed a belt-driven speed-reducing unit supported by a machine shaft driven by such unit, the organization being such that the tension of the driving belt imposes on the gear case of the unit a turning moment in the direction of reaction of the torque of the driven shaft. The torque reaction is normally resisted by a so-called torque arm pivoted to the gear case of said unit and to a fixture, said torque arm being adapted to release the connection normally established when the load thereon exceeds a predetermined value. In this action the gear case turns in the direction of torque reaction, thereby decreasing the distance between centers of the belt pulleys, with consequent relief of belt tension.

A further feature of the invention is a limit switch controlled by the torque arm which switch may be connected in an electric circuit to stop the motor upon overload.

The specific device employed as a torque arm in the organization above described comprises an overload release connector embodying the invention herein claimed.

In the accompanying drawings:

Figs. 1 and 2 are front end views of machinery drives employing a speed-reducing unit of the type aforesaid held in fixed position by a torque arm arranged in Fig. 1 as a tension member and in Fig. 2 as a compression member.

Fig. 3 is a front view of the gear case of said unit, showing in dotted lines the speed-reducing gearing therein.

Fig. 4 is a top plan view of an overload release connector employed as a part of the torque arm shown in Figs. 1 and 2.

Fig. 5 is a longitudinal vertical section of said connector, end portions thereof being broken away for compactness of illustration.

Fig. 6 is a cross section on the line 6—6 of Fig. 5.

Fig. 7 is a cross section on the line 7—7 of Fig. 9.

Fig. 8 is a partial longitudinal section of a connector modified for increased load-carrying capacity by having two sets of locking elements.

Fig. 9 is a partial longitudinal section of the connector of Fig. 5 showing the mechanism in released condition due to a longitudinal force in compression.

Fig. 10 is a similar view showing the mechanism in released condition due to a longitudinal force in tension.

Fig. 11 is a partial longitudinal section of a connector similar to that of Fig. 5 except for a modified means to control operation of the limit switch.

Fig. 12 is a diagrammatic representation of a limit switch arranged for use with the structure shown in Fig. 5.

Fig. 13 is a diagrammatic representation of a limit switch of said type arranged for use with the switch controlling means shown in Fig. 11.

Fig. 14 is an illustrative diagram of an electric circuit system.

Referring first to Figs. 1 and 2, the machine shaft 1, mounted in suitable bearings not shown, supports a transmission unit comprising speed-reducing gearing in a gear case 2 carrying a power-input shaft 3 connected by said gearing to a tubular power-output shaft or sleeve 4 which is fixed on the shaft 1 in driving connection therewith by a key 5. The speed-reducing gearing shown in Fig. 3 comprises a pinion 6 on the power-input shaft meshing with a gear 7 on an intermediate shaft 8, and a pinion 9 on said intermediate shaft meshing with a gear 10 on the sleeve 4. Said sleeve extends through the opposite walls of the gear case and is fastened to the shaft 1 by set-screwed clamping collars one of which is shown at 11.

The power-input shaft 3 is driven from the shaft 12 of a stationarily mounted electric motor 13 by a belt 14 engaging a driving pulley 15 on the motor shaft and a driven pulley 16 on the power-input shaft, the arrangement being such that the tension of the driving belt 14 imposes on the gear case a turning movement in the direction of reaction of the torque of the driven shaft 1. The gear case 2 is normally held in belt-tensioning position by a torque arm 17 pivoted at one end by the bolt 18 to the gear case 2 and its other end by the bolt 19 to a fixture 20. The torque arm includes the overload release connector of Figs. 4 to 10 and also a turnbuckle 21 by which the torque arm can be shortened or lengthened to adjust the angular position at which the gear case is held. The torque arm may be arranged to function either in tension or compression. Assuming that the shaft 1 as viewed in Figs. 1 and 2 is driven in a clockwise direction, the torque reaction on the gear case is in a counterclockwise direction, wherefore the torque arm arranged as in Fig. 1 functions as a tension member and as arranged in Fig. 2 functions as a compression member. When the load imposed on the torque arm exceeds a predetermined value, the connection normally established by the torque arm is released and the limit switch actuated, with accompanying rotative movement of the gear case in the direction of torque reaction thereon and consequent slackening of the driving belt.

The torque arm comprises a rod 22 extending into and slidably fitted in a tube 25 to which it is releasably locked by locking means presently to be described. The rod 22 has a screw-threaded portion engaged by one end of the turnbuckle 21, the other end of which engages a threaded rod 23 having an eye through which passes the pivot bolt 18 by which the torque arm is pivoted to the gear case. Said rod 22 is formed near the threaded portion with wrench slots 24 for engagement by a wrench to hold the rod from turning as the turnbuckle is operated to shorten or lengthen the torque arm. The tube 23 extends into a bore in a hinge member 26 to which said tube is fixed by the pin 27. A transverse bore 28 in said hinge member receives the pivot bolt 19 by which the torque arm is pivoted to the fixture 20.

The rod 22 is releasably locked to the tube 25 by a plurality of steel balls 29 seated in an annular cam groove 30 in said rod and held in appropriately angularly spaced relation in holes therefor in said tube, in which holes the balls are fitted for radial movement. Said balls engage the inside coincal surfaces of a pair of confronting cup rings or camming washers 31 slidable on said tube. Said cup rings are forced toward each other by a pair of balanced compression springs 32 and 33 fitted and housed in an outer tube or casing 34.

The spring 32 is compressed between one of said cup rings and a washer 35 abutting a shoulder 36 in the rear end of the spring housing, which shoulder is provided by an expansible snap ring sprung into an annular groove in said housing. The spring 33 is compressed between the other cup ring and a washer 37 abutting an adjusting nut 38 slidably and rotatably fitted on the rod 22 and screwed into the fore end of the spring housing 34. By rotating said nut, the tension of the springs 32 and 33 can be adjusted to increase or decrease the load-carrying capacity of the torque arm.

Said adjusting nut 38 has fixed thereto a sleeve 39 enclosing the fore end of the spring housing and having a detent for releasably locking said nut in adjusted position, said detent comprising a spring-loaded ball 40 engaging in a longitudinal groove 41 in said housing and disengageable therefrom by a forced rotative movement of the adjusting nut. As shown in Fig. 4, a scale associated with the groove 41 provides for calibration of the spring pressure.

The spring housing 34 is held from rotative movement by a key 42 fixed to the hinge member 26 and engaging a groove in said housing.

The rod 22 and tube 25 exemplify telescoping parts of relatively axially displaceable torque arm sections releasably held in fixed axial relation by the locking means, one of said sections comprising the turnbuckle 21 and rods 22 and 23 connected thereby, the other section comprising the tube 25 and hinge member 26 to which it is attached.

When the load on the torque arm exceeds the load-carrying capacity of the locking means, the resultant axial movement of the rod 22 relative to the tube 25 will force the balls radially outwardly by camming action of its cam groove 30, thereby forcing apart the cup rings 31 against the resistance of the springs 32 and 33. This movement will displace the cam groove 30 relative to the balls, so that they will bear on said rod at one side or the other of said cam groove, according to the direction of the longitudinal force on the torque arm, thus releasing the rod from its locked position and permitting it to slide axially in the tube. The movement of the rod 22 in the releasing action is in the direction of the applied force, i. e. in a direction to shorten the torque arm if arranged as a compression member, and in a direction to lengthen the torque arm if arranged as a tension member, as will be readily understood from Figs. 9 and 10.

The locking means shown is designed to obtain a relatively high mechanical advantage of the springs 32 and 33 to resist releasing action, due to the moderate slope of the inside conical surfaces of the cup rings 31, as seen in the drawings, more nearly in an axial direction than in a radial direction. When the balls are cammed outwardly to a position such that they bear against the inside edges of the adjacent ends of the cup rings, the mechanical advantage is lessened, permitting instant release of the rod 22 from its locked position.

A shoulder 43 on the rod 22 limits its axial movement relative to the tube 25 when said rod is released from its locked position. If the torque arm works in compression, the movement of said rod when released is limited by abutment of said shoulder against the fore end of said tube, as shown in Fig. 9. If the torque arm works in tension, the movement of said rod when released is limited by abutment of said shoulder against the inner end of the adjusting nut 38, as shown in Fig. 10. Said shoulder 43 may be provided by a contractile snap ring engaging in an annular groove in said rod.

The load carrying capacity of the torque arm could be increased by modifying the overload release means as shown in Fig. 8, wherein the rod 22 and tube 25 are releasably locked in fixed axial relation by the set of balls 29 and associated elements already described and an additional set of such balls and associated elements spaced axially from the first. In this instance the springs 32 and 33 cooperate with an interposed spring 44 to resist releasing action. The balls of the right hand set shown in Fig. 8 are held seated in the cam groove therefor by the balanced springs 32 and 44 pressing toward each other the cup rings associated with said set of balls. Likewise the balanced springs 33 and 34, pressing toward each other the cup rings associated with the left hand set of balls, hold them seated in the cam groove therefor.

A limit switch carried by the torque arm is controlled thereby through very simple and practicable means to operate when release action occurs, which switch may control any suitable electric circuit to perform a desired function in response to release action, e. g. to shut off motive power or to sound an alarm or to exercise remote control of auxiliary equipment.

In the drawings, the numeral 45 designates the switch box of a snap action switch controlled by a plunger or push pin 46 to open or close when the plunger is pushed inwardly relative to said box and to reverse its operation when the plunger is released for outward movement relative to the box. Said plunger or push pin 46 exemplifies a switch actuator operated by relative movement of the rod 22 and tube 25.

The switch may be, for example, of the type disclosed in the patent to McGall No. 1,960,020, dated May 22, 1934. This is a normally open switch which by a system of leaf springs is spring-actuated to close when the plunger is pushed inwardly relative to the box, and held closed by spring action so long as the plunger is held in its innermost position in the box, but will open by spring action when the plunger is released from the holding force thereon. The switch plunger 46 is movable in a guide provided by a tubular protuberance 47 of the switch box. The plunger has an enlarged head within the box to limit its movement outwardly relative to the box and hence to prevent it from dropping out. The switch box 45 is of Bakelite or other suitable structural insulating material, as is also the plunger 46 or the head thereof.

The switch box 45 is mounted in fixed position relative to the hinge member 26 in a housing 48 formed on said member and closed by a removable cover plate 49. Screwed into a wall of said housing is a tubular plug 50 through which passes an electric cable 51 containing insulated circuit wires 52 and 53 (Fig. 5) for connection to the switch. In Fig. 4, there are indicated in dotted lines three switch terminals 54, 55 and 56. The wire 52 is electrically connected to the terminal 54. The wire 53 is electrically connected to one of the other terminals, in this instance the terminal 55. The third terminal 56 is for alternative use as will hereinafter appear.

The switch box is so located over the tube 25 that the protuberance or guide 47 is on the under side of the box and extends into or through an opening in the bottom wall of the housing 48. The plunger 46, which extends through an opening in the tube 25, is disposed radially to said tube and rod 22. In view of the position of the switch box shown in Figs. 4 to 11, the plunger may be conveniently described as movable axially between up and down positions, the up position thereof being its outer position relative to the rod 22 and its inner position relative to the switch box, and the down position of the plunger being its inner position relative to said rod and its outer position relative to the switch box.

The plunger 46 is normally held in its up position. As shown in Figs. 5, 9 and 10, the rod 22 is formed with a wide annular groove or relief area 57 reducing the diameter of said rod for a substantial portion of its length, said groove being adjacent to the rear end portion 58 of said rod, which portion is slidably fitted in the tube 25. Under normal operating conditions, the rod being locked to the tube, the plunger 46 bears on 58 and is thereby held in its up position. In the lock releasing operation, the movement of said rod relative to said tube displaces 58 from under the plunger, allowing it to drop to its down position. If the torque arm is arranged as a compression member, the rod moves rearwardly in the releasing operation, as shown in Fig. 9, allowing the plunger to drop to its down position in the groove 57. If the torque arm is arranged as a tension member, the rod moves forwardly in the releasing operation, allowing the plunger to drop to its down position behind 58, as shown in Fig. 10.

The rear end portion 58 of said rod is formed with beveled end surfaces whereby after a releasing operation movement of said rod to a position for the balls 29 to snap into the cam groove 30 will cam the plunger 46 to its up position on said portion 58.

In the modified structure shown in Fig. 11, the arrangement for controlling the position of the plunger is reversed, so that the plunger normally rests in its down position. In said Fig. 11, the telescoping rod and tube, being somewhat longer than in the structure hereinbefore described, are designated by the numerals 122 and 125, and the plunger is designated by the numeral 146. The rod 122 is formed with a narrow cam groove 147 and extends rearwardly a substantial distance from said groove. The plunger 146 normally bears on said rod in said groove. Otherwise the structure of Fig. 11 is the same as that first described. In the lock releasing operation, movement of the rod 122 in either direction will cam the plunger 146 out of the cam groove 147, so that the plunger will bear on the cylindrical portion of said rod behind said cam groove if release occurs in compression, and on the cylindrical portion of the rod in front of said cam groove if release occurs in tension. In short, the structure of Fig. 11 is substantially the same as that first described except for a reverse arrangement of the means for operating the switch actuator by the torque arm, requiring a reverse arrangement of the limit switch.

Fig. 12 diagrammatically represents a limit switch arranged for use in the structure of Fig. 5, and Fig. 13 diagrammatically represents the same or a similar switch arranged for use with the structure of Fig. 11.

In Figs. 12 and 13, the numeral 60 designates an electrically conductive contact arm represented as a leaf spring anchored at one end to a conducting element 61 fixed in the insulating switch box and electrically connected to the switch terminal 54 to which the circuit wire 52 is connected. The free end of said arm 60 is provided with a contact 62 arranged between a pair of contact bars or plates 63 and 64 fixed in the switch box and connected respectively to the switch terminals 55 and 56 to one of which the circuit wire 53 is connected. The spring arm 60 is normally biased to contact with 64 but is adapted to contact with 63 on movement of the switch plunger to its up position and to remain in contact with 63 so long as the switch plunger is held in such position.

In Fig. 12 the plunger 46 is normally held in its up position, and the circuit wire 53 is connected to the switch terminal 55, so that the contact 63 is live and the contact 64 dead. Thus the switch in Fig. 12 is a normally closed switch connecting the circuit wires 52 and 53 through conducting element 61, contact arm 60 and live contact 63. On release action of the torque arm, the plunger 46 drops to its down position in groove 57, allowing the switch to open by spring action.

In Fig. 14, the plunger 146 is normally in the down position in groove 147, and the circuit wire 53 is connected to the switch terminal 56. The arm 60 is now normally in contact with 64, which is the live contact, while 63 is dead. Thus the switch of Fig. 13 is a normally closed switch connecting the circuit wires 52 and 53 through 61, 60 and 64. On release operation of the torque arm, the plunger is raised to the up position on rod 122, thereby opening the switch and holding it open until the telescoping parts of the torque arm are restored to normal relation.

Fig. 14 is an illustrative diagram of an electric circuit system that may be controlled by the limit switch to shut off motive power when release action of the torque arm occurs. As represented by said diagram, the circuit of the electric motor 13 includes a normally open switch 65 operated to close by an electro-magnet the energizing coil of which is indicated at 66. The diagram represents a condition of the system which exists before energization of said coil, the switch 65 being open and the motor circuit being therefore open. The circuit of said coil 66 is represented as a straight line circuit 67 leading from an electrically charged line 68 to a ground connection at 69. The circuit line 67 includes a normally open starting switch 70 of the push-button type and a normally closed stop switch 71 which may also be of said type, said stop switch being between the charged line 68 and the starting switch 70. Connected in a shunt circuit 72 around the starting switch 70 is the normally closed limit switch 73 corresponding to the limit switches already described. In said shunt circuit, between the limit switch and coil 66, is a normally open interlock switch 74 controlled by the coil 66 to close when the coil is energized. To start the motor 13, the push-button starting switch 70 is momentarily closed, with the effect of energizing the coil 66 by flow of current through the momentarily closed line 67. This causes closing of the motor switch 65 and closing of the interlock switch 74 which become mechanically locked in closed position. Upon release of the starting switch 70 from closed position, the current flows to the coil through the shunt line 72 including the normally closed limit switch 73 and the now closed interlock switch 74. The switch 65 closing the motor circuit will be held closed so long as the coil 66 remains energized, i. e. until the circuit of said coil is opened either by opening of the limit switch 73 by release action of the torque arm or by momentarily opening the stop switch 71. Thus the condition established by the momentary closing of the starting switch 70 is such that the limit switch 73 controls the motor circuit to open when release action of the torque arm occurs.

Referring again to Figs. 1 and 2, it will be remembered that in the release action of the torque arm the gear case of the speed-reducing unit turns in the direction of torque reaction, with resultant relief of belt tension. After such action and stopping of the motor, the torque arm can be restored to its normal operative load-carrying condition by simply turning the gear case in the opposite direction until the connector rod 22 (Fig. 5) or 122 (Fig. 11) is moved to the position in which it becomes locked by engagement of the balls 29 in the cam groove 30. In this last operation, the limit switch actuator or plunger 46 if controlled as in Figs. 5, 9, 10 and 12 is cammed to its normal up position on the rear end rod portion or last 58 (Fig. 5). In the case of the alternative construction of Fig. 11, movement of the rod 122 to locked position in the tube 125 causes the switch plunger 146 to assume its normal down position by snapping into the cam groove 147.

The switch contained in the switch box 45 and including the switch elements shown in Fig. 12 or Fig. 13 may be in control of the motor 13 through circuit connections which need not be here described. An illustrative circuit is described in my said copending application Serial No. 255,274.

It will be understood that the invention herein described as embodied in a torque arm is not limited to use as or in a torque arm.

I claim:

1. An overload release connector comprising a tube, a rod slidably fitted in said tube, said rod having an annular cam groove, angularly spaced balls seated in said groove, said tube having guide holes through which the balls protrude and in which they are movable radially, a pair of confronting cup rings slidably fitted on said tube and having tapered inside surfaces engaged by said balls, balanced compression springs forcing said cup rings toward each other for holding the balls in said cam groove, and a housing for said springs having abutments therein between which and said cup rings the said springs are respectively compressed, said cup rings being held by the springs about midway between said abutments, said balls being forcibly displaceable from said cam grooved by a forced relative movement of said rod and tube in either direction.

2. An overload release connector comprising a tube, a rod slidably fitted in said tube, said rod having an annular groove, angularly spaced balls seated in said groove, said tube having guide holes through which the balls protrude and in which they are movable radially, a pair of confronting cup rings slidably fitted on said tube and having tapered inside surfaces engaged by said balls, balanced compression springs engaging said rings respectively and forcing said rings toward each other for holding the balls in said groove, a housing for said springs having abutments therein between which and said rings the said springs are respectively compressed, said balls being forcibly displaceable from said groove by a forced relative movement of said rod and tube, an adjusting nut screwed into one end of the housing and providing one of said abutments, and a sleeve fixed on said nut and enclosing the adjacent end of said housing, said sleeve having a detent cooperable with the housing for releasably locking the nut in adjusted position.

3. An overload release connector, comprising, a tube, a rod slidably fitted in said tube, said rod having an annular groove, angularly spaced balls seated in said groove, said tube having guide holes through which the balls protrude and in which they are movable radially, a pair of confronting cup rings slidably fitted on said tube and having tapered inside surfaces engaged by said balls, compression springs on opposite sides of said balls engaging said rings respectively and forcing said rings toward each other for normally holding the balls in said groove to releasably hold the rod and tube in locked position, said balls being displaceable from said groove by a forced relative axial movement of said rod and tube in either direction to release the rod, a switch actuator comprising a radially disposed plunger bearing on said rod and movable radially between outer and inner positions relative to said rod, and a guide for said plunger in fixed relation to said tube, said rod being formed to control said plunger to assume one of said positions when said rod is moved to release position and to assume the other of said positions when said rod is restored to locked position.

4. An overload release connector comprising a tube, a rod slidably fitted in said tube, said rod having axially spaced cam grooves, sets of angularly spaced balls seated in the respective grooves, said tube having guide holes through which the balls protrude and in which the balls are movable radially, a plurality of pairs of cup rings associated respectively with the respective sets of balls, the rings of each pair confronting and having tapered inside surfaces engaged by the balls of the associated set, and a plurality of compression springs arranged in end to end relation and in alternation with said pairs of cup rings, each pair of cup rings being between two of said springs and forced thereby toward each other for holding the associated balls in the cam groove therefore, said sets of balls being forcibly displaceable from said cam grooves by a forced relative movement of said rod and tube in either direction.

5. An overload release connector, comprising, a tube, a rod slidably fitted in said tube, said rod having an annular groove, angularly spaced balls seated in said groove, said tube having guide holes through which the balls protrude and in which they are movable radially, a pair of confronting cup rings slidably fitted on said tube and having tapered inside surfaces engaged by said balls, said rings having adjacent end faces respectively extending radially outwardly from the larger diameter ends of said inside tapered surfaces, and balanced compression springs engaging said rings respectively and forcing said rings toward each other for normally holding the balls in said groove, said balls being displaceable from said groove by a forced relative movement of said rod and tube to permit relative axial movement of the rod and tube, said tapered surfaces extending more nearly in an axial direction than in a radial direction, whereby the balls must be forced outwardly into engagement with said end faces in order to free them from said groove.

6. An overload release connector comprising a tube, a rod having one end slidably fitted in said tube and its other end projecting therefrom, said rod having an annular groove normally inside the tube, angularly spaced balls seated in said groove, said tube having guide holes through which the balls protrude and in which they are movable radially, a pair of confronting cup rings slidably fitted on said tube and having tapered inside surfaces engaged by said balls, balanced compression springs engaging said rings respectively and forcing said rings toward each other for holding the balls in said groove, a housing for said springs having abutments therein between which and said rings the said springs are respectively compressed, said balls being forcibly displaceable from said groove by a forced relative movement of said rod and tube in either direction, said rod having a shoulder thereon between an end of said tube and one of said abutments in said housing, said shoulder coacting with said end of the tube to limit relative movement of the rod and tube in one direction and cooperating with said one of the abutments to limit such relative movement in the opposite direction.

7. An overload release connector comprising a tube, a rod slidably fitted in said tube, said rod having an annular groove, angularly spaced balls seated in said groove, said tube having guide holes through which the balls protrude and in which they are movable radially, a pair of confronting cup rings slidably fitted on said tube and having tapered inside surfaces engaged by said balls, balanced compression springs engaging said rings respectively and forcing said rings toward each other for holding the balls in said groove to releasably hold the rod and tube in locked position, a housing for said springs having abutments therein between which and said rings the said springs are respectively compressed, said rings being held by the springs about midway between said abutments, said balls being forcibly displaceable from said groove by a forced relative movement of said rod and tube to release the rod, a limit switch, and interposed actuating connections between said rod and said switch for opening the switch upon movement of the rod to release position.

8. An overload release connector, comprising, a tube, a rod slidably fitted in said tube, said rod having an annular groove, three angularly spaced balls seated in said groove, said tube having guide holes through which the balls protrude and in which they are movable radially, a pair of confronting cup rings slidably fitted on said tube and having tapered inside surfaces engaged by said balls, said tapered surfaces extending more nearly in an axial direction than in a radial direction, balanced compression springs engaging said rings respectively and forcing said rings toward each other for normally holding the balls in said groove, said balls being displaceable from said groove by a forced relative movement of said rod and tube to permit relative axial movement of the rod and tube, and an electrical switch actuated by relative movement of said rod and tube.

References Cited in the file of this patent

UNITED STATES PATENTS

| | | |
|---|---|---|
| 648,382 | Blakeslee | May 1, 1900 |
| 2,132,951 | Hall | Oct. 11, 1938 |
| 2,340,465 | Gerlach | Feb. 1, 1944 |
| 2,516,642 | Murphy | July 25, 1950 |
| 2,554,969 | Williams | May 29, 1951 |

FOREIGN PATENTS

| | | |
|---|---|---|
| 548,416 | Germany | Apr. 15, 1932 |
| 611,130 | Great Britain | Oct. 26, 1948 |